US 9,392,747 B2

(12) United States Patent
Patterson et al.

(10) Patent No.: US 9,392,747 B2
(45) Date of Patent: Jul. 19, 2016

(54) FINGER DRIVE FOR A CROP FEED ROLLER

(71) Applicant: MacDon Industries Ltd., Winnipeg (CA)

(72) Inventors: Roger Patterson, Duncan (CA); John Edward Enns, East St. Paul (CA); David James Jordan, Newton, KS (US)

(73) Assignee: MacDon Industries Ltd., Winnipeg, MB (CA)

( * ) Notice: Subject to any disclaimer, the term of this patent is extended or adjusted under 35 U.S.C. 154(b) by 0 days.

(21) Appl. No.: 14/570,229

(22) Filed: Dec. 15, 2014

(65) Prior Publication Data

US 2015/0208582 A1 Jul. 30, 2015

Related U.S. Application Data

(60) Provisional application No. 61/933,388, filed on Jan. 30, 2014.

(51) Int. Cl.
| | | |
|---|---|---|
| *A01D 39/00* | (2006.01) | |
| *A01D 43/02* | (2006.01) | |
| *A01D 75/00* | (2006.01) | |
| *A01D 61/00* | (2006.01) | |
| *A01D 41/14* | (2006.01) | |

(52) U.S. Cl.
CPC ............ *A01D 61/008* (2013.01); *A01D 61/002* (2013.01); *A01D 41/14* (2013.01)

(58) Field of Classification Search
CPC ..... A01D 57/03; A01D 89/002; A01D 41/10; A01D 89/00
USPC ................ 56/341, 226, 364; 460/20; 100/142
See application file for complete search history.

(56) References Cited

U.S. PATENT DOCUMENTS

| | | | | | |
|---|---|---|---|---|---|
| 2,388,212 | A | * | 10/1945 | McElhoe | A01D 41/10 56/226 |
| 2,548,329 | A | * | 4/1951 | Van Sickle | A01D 89/002 171/90 |
| 2,893,537 | A | * | 7/1959 | Krahn | A01D 41/10 198/512 |
| 3,472,008 | A | * | 10/1969 | Hurlburt | A01D 57/03 56/1 |
| 3,545,185 | A | * | 12/1970 | Dorsett | A01D 29/00 56/14.6 |
| 3,751,888 | A | * | 8/1973 | James | A01D 57/03 56/12.4 |
| 3,754,383 | A | * | 8/1973 | Burrough | A01D 43/107 280/43 |

(Continued)

FOREIGN PATENT DOCUMENTS

| | | |
|---|---|---|
| CA | 554210 | 3/1958 |
| CA | 675367 | 3/1963 |

(Continued)

*Primary Examiner* — Árpád Fábián-Kovács
(74) *Attorney, Agent, or Firm* — Adrian D. Battison; Ade & Company Inc.

(57) ABSTRACT

A crop feeding roller for a header includes a plurality of finger units within the roller each having a pair of fingers projecting outwardly for engaging crop outside the peripheral wall of the roller. The peripheral wall has opposed finger guide holes associated with the pair of fingers. Each finger unit including an inner member carrying the fingers and containing an elongate guide slot transverse to the axis of the roller and a stationary guide member within the guide slot at a position within the roller arranged to cause the inner member with the fingers of each of the finger units to reciprocate during the rotation of the roller. The guide slot is shaped with at least one curved lobe to one side of a transverse center section so that the slot can be S-shaped or C-shaped to improve the dwell time and swept area obtained by the finger movement.

19 Claims, 10 Drawing Sheets

(56) References Cited

U.S. PATENT DOCUMENTS

| | | | |
|---|---|---|---|
| 3,940,910 A * | 3/1976 | d'Acremont | A01D 57/02 56/14.4 |
| 3,983,683 A * | 10/1976 | James | A01D 89/00 56/364 |
| 4,161,859 A * | 7/1979 | Storm | A01D 89/002 56/364 |
| 4,297,833 A * | 11/1981 | Gaeddert | A01D 89/002 56/364 |
| 4,539,801 A * | 9/1985 | Field | A01D 61/008 198/613 |
| 4,928,462 A * | 5/1990 | Lippens | A01F 15/101 100/142 |
| 4,970,849 A * | 11/1990 | Friesen | A01D 41/10 56/12.4 |
| 5,007,235 A * | 4/1991 | Nickel | A01D 57/03 384/281 |
| 5,090,187 A * | 2/1992 | Mews | A01D 89/002 56/119 |
| 5,293,730 A * | 3/1994 | Bich | A01D 89/002 56/10.2 G |
| 5,359,839 A * | 11/1994 | Parsons | A01D 57/03 460/122 |
| 5,987,861 A * | 11/1999 | Duncan | A01D 57/03 460/142 |
| 6,279,304 B1 * | 8/2001 | Anstey | A01D 89/008 198/676 |
| 6,430,904 B1 | 8/2002 | Coers et al. | |
| 6,502,379 B1 * | 1/2003 | Snider | A01D 57/02 56/221 |
| 6,530,202 B1 * | 3/2003 | Guyer | A01D 57/03 56/220 |
| 6,640,527 B2 | 11/2003 | Farley et al. | |
| 6,675,568 B2 | 1/2004 | Patterson | |
| 7,392,646 B2 | 7/2008 | Patterson | |
| 8,156,723 B1 * | 4/2012 | McClure | A01D 89/002 56/341 |
| 8,240,117 B1 * | 8/2012 | McClure | A01D 89/008 56/341 |
| 2011/0314786 A1 * | 12/2011 | Kidd | A01D 89/005 56/345 |
| 2015/0313081 A1 * | 11/2015 | Jost | A01D 57/03 56/17.3 |

FOREIGN PATENT DOCUMENTS

| | | | |
|---|---|---|---|
| CA | 2341283 | 9/2002 | |
| SU | 957791 A * | 11/1980 | A01D 89/00 |
| SU | 1130240 A * | 12/1984 | A01D 89/00 |
| WO | WO 8706793 A * | 11/1987 | A01D 84/00 |

* cited by examiner

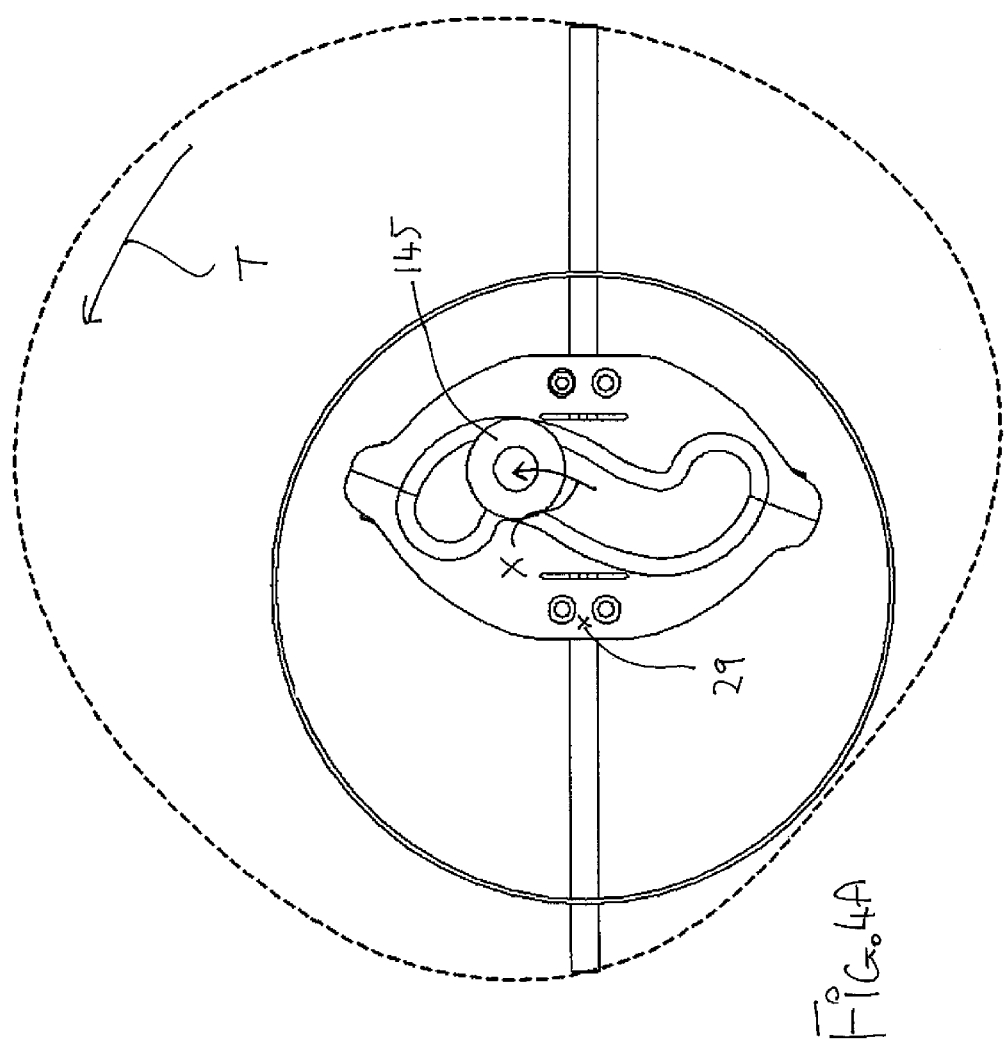

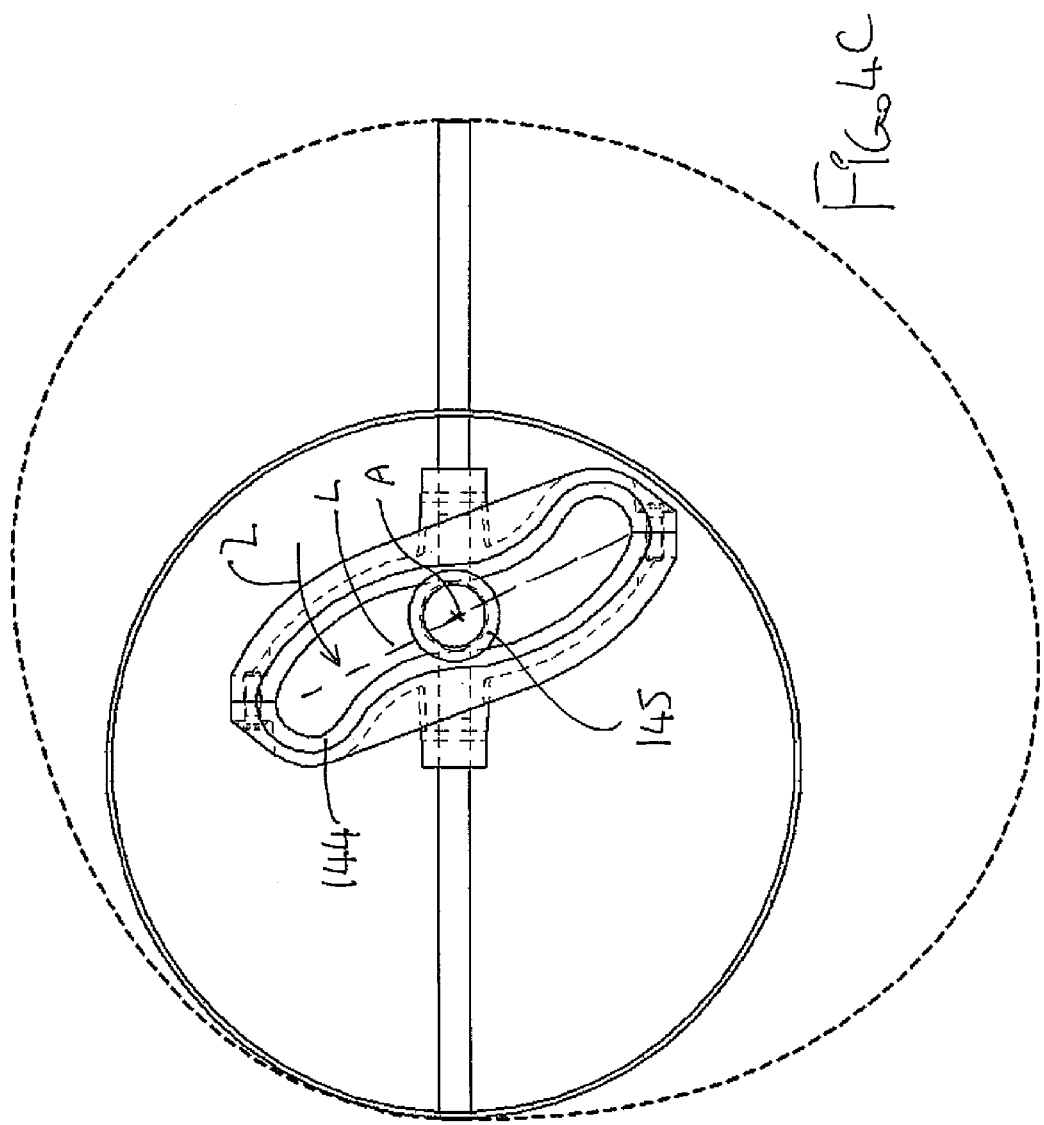

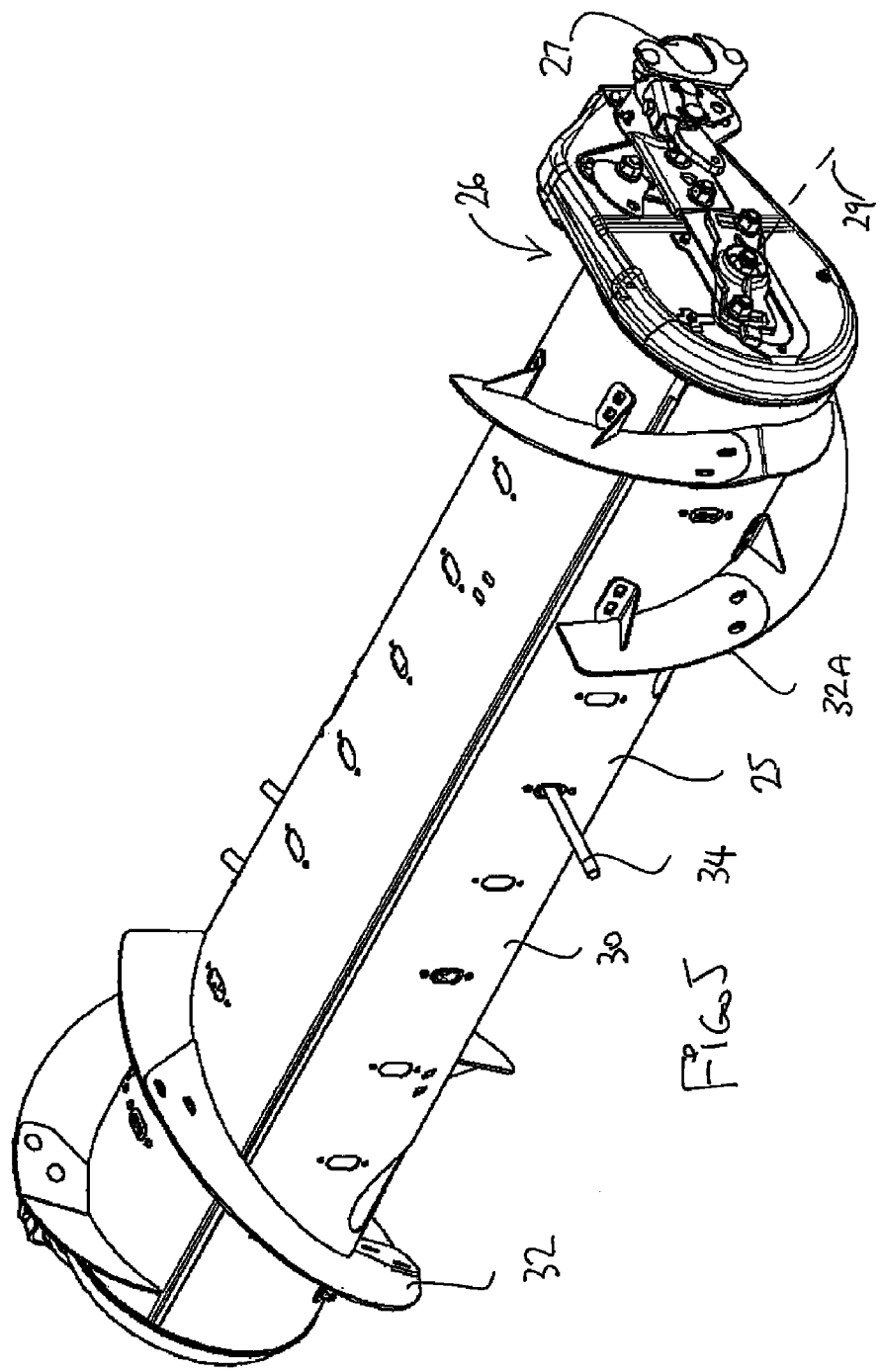

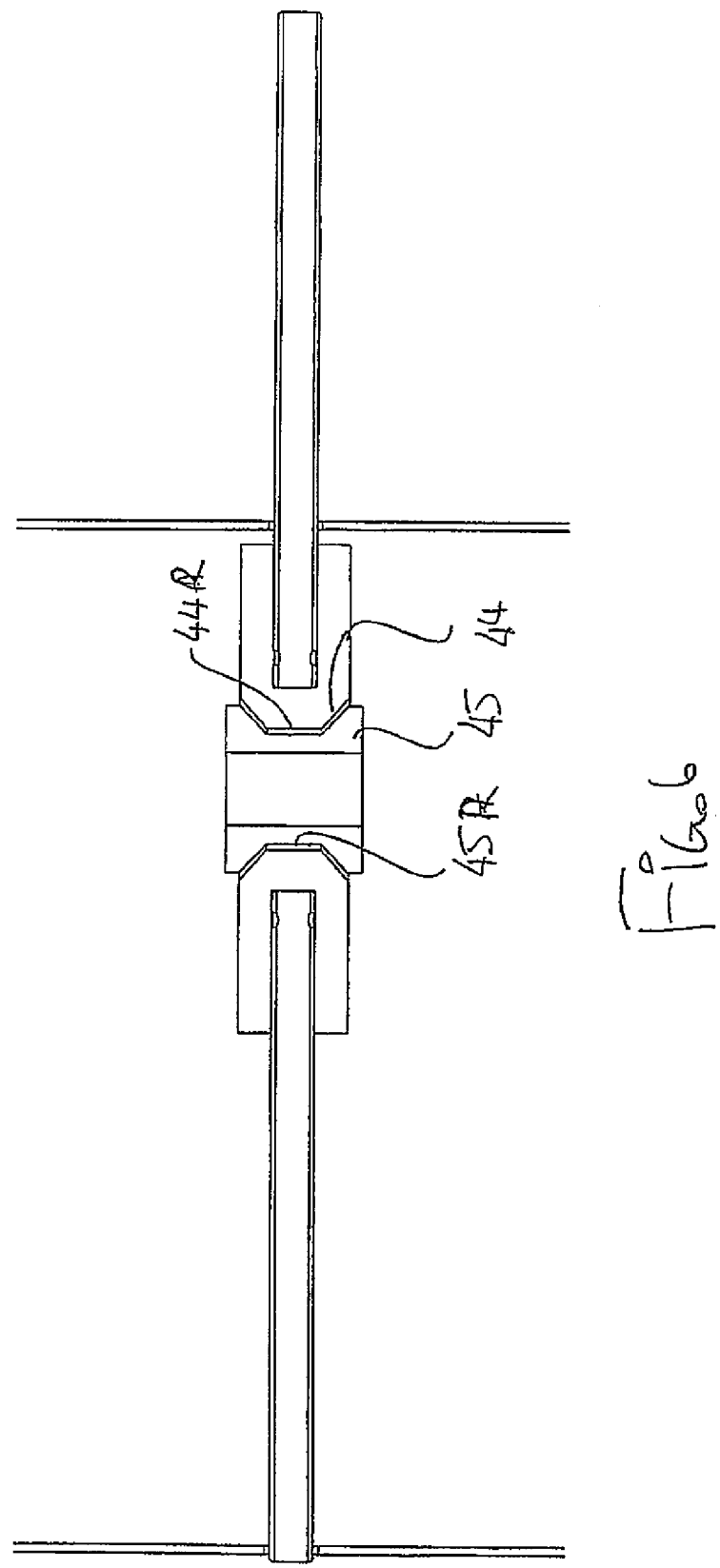

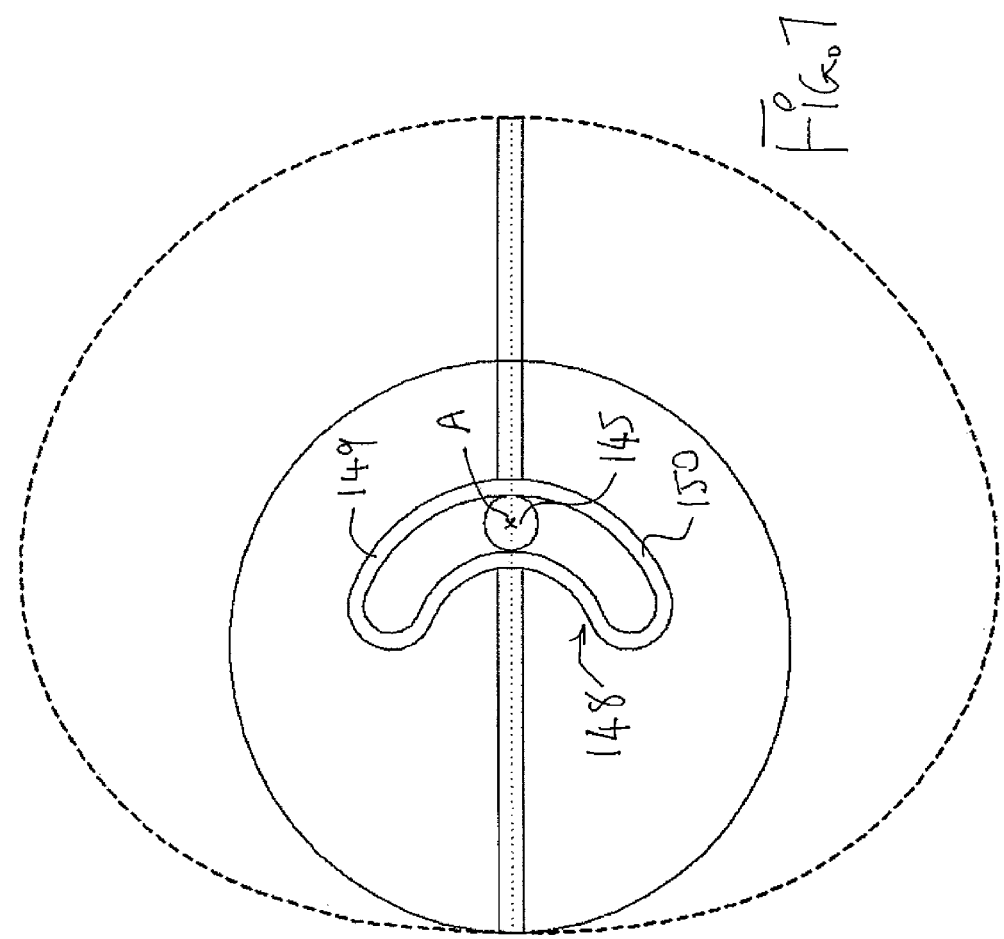

FINGER DRIVE FOR A CROP FEED ROLLER

This application claims the benefit under 35 USC 119(e) of Provisional Application 61/933,388 filed Jan. 30, 2014.

This invention relates to a feed roller of the type having generally radially extending fingers which move relative to the roller axis so that their length extending from the roller surface changes around the roller axis for engaging into and for releasing the crop.

BACKGROUND OF THE INVENTION

Feed rollers are commonly used in crop harvesting machines for guiding the crop from a position in front of the roller to a position rearwardly of the roller. Such rollers are used in many different locations in crop feeding systems and the arrangement described herein is not limited to any particular location of such a crop feeding roller.

However one primary use of such rollers is in that of guiding the crop from a harvesting header into the feeder house of a combine harvester. Such headers can be of the type which simply provide a cutter bar across the front of the header using any suitable cutting technique behind which is located the guide roller which includes an auger flight for transporting the crop material inwardly from the width of the cutter bar to the narrower width of the feeder house.

Other arrangements include a feed draper system so that the crop is transported primarily from the width of the cutter bar inwardly to the narrow width of the feeder house using one or more side drapers which carry the crop to a central feed draper which moves rearwardly toward the feeder house. Arrangements of this type are manufactured by a number of manufactures but primarily by the assignee herein. In the draper header system, the feed roller is therefore much narrower since it is only intended to guide the material into the feeder house rather than the transport the material wholly along the length of the header. In many cases therefore the roller is also of smaller diameter.

In all of these arrangements, the roller generally includes a series of angularly and axially spaced fingers which project through the peripheral wall forming the roller and outwardly from the outer peripheral surface of the roller so as to engage the crop.

The fingers are driven so that they move longitudinally so as to increase and decrease their extension from the peripheral wall of the roller. Their maximum extension from the peripheral surface of the roller is located at the location where the fingers are intended to engage and grasp the crop and the minimum extent is located at the position where the fingers are intended to release the crop. Thus the fingers generally are at their maximum extent at a position directly forwardly of the roller and the fingers rotate with the roller around the underneath of the roller and are retracted as they move behind the roller to allow the crop to be released to enter into the feeder house to be engaged by the feeder chain of the feeder house. At the position rearward of the roller, the fingers are retracted by the position of the finger axis to locations substantially flush with the surface of the roller to release the crop.

This arrangement is well established, widely used and has been widely successful.

One arrangement of this type is shown in U.S. Pat. No. 7,392,646 (Patterson) issued Jul. 1, 2008 and assigned to the present assignees, the disclosure of which is incorporated herein by reference.

SUMMARY OF THE INVENTION

It is one object of the resent invention to provide a crop feeding apparatus of the type including a feed roller with outwardly extending fingers where the feeding action of the fingers is improved.

According to the invention there is provided a feeding apparatus comprising:

a rotatable roller mounted for rotation around a longitudinal axis such that an outer peripheral wall of the roller rotates;

a plurality of finger units mounted within the roller arranged to provide a plurality of fingers projecting outwardly of the peripheral wall for engaging crop outside the peripheral wall;

each finger unit including a pair of fingers, the roller having in the peripheral wall thereof a plurality of pairs of finger guide holes spaced axially of the roller with each pair disposed on opposite sides of the roller;

each pair of finger guide holes being associated with said pair of fingers of a respective finger unit such that each of said pair of fingers extends through and is slidable in a respective one of said pair of holes in opposite sides of the roller so as to be movable along its length from a retracted position in which an end of the finger is adjacent the peripheral wall to an extended position;

each finger unit including an inner member within the roller to which the pair of fingers are affixed so that movement of the inner member acts to drive the fingers to said retracted and extended positions;

said inner member containing an elongate guide slot extending transversely to the axis of the roller and generally transverse to the longitudinal direction of movement of the fingers;

and a stationary guide member within the roller mounted within the guide slot at a position within the roller arranged to cause the inner member with said fingers of each of the finger units to reciprocate during the rotation of the roller;

wherein the guide slot of the inner member is shaped so as to comprise at least one curved lobe portion.

Preferably the guide slot lies in a radial plane of the axis of the roller.

Preferably the fingers lie on a diameter of the roller and the guide holes are diametrically opposed.

Preferably the guide slot and the stationary guide member are correspondingly V-shaped in cross-section so as to maintain the guide member tracking in the guide slot.

Preferably the stationary guide member includes a roller running in the guide slot.

Preferably the inner member is formed in two portions each forming one side of the guide slot. In this arrangement the portions can be identical and bolted back to back so as to define the slot therebetween. In this arrangement each of the portions can carry a respective one of the fingers.

Preferably each inner member carries only a single pair of diametrically opposed fingers. That is the system acts to drive only one pair of opposed fingers with other fingers being driven by or associated with separate finger units. However arrangements where the inner member carries additional fingers arranged at spaced positions axially of the roller can be provided.

Preferably the stationary guide member is mounted for adjustment angularly of the axis of the roller to change the finger pattern.

Preferably each guide hole includes a stationary tubular bearing in the roller wall through which the finger reciprocates in the longitudinal direction.

Preferably the peripheral surface of the roller carries a helical flight which can be located at each end and the fingers in their maximum extent project outwardly beyond the outer edge of the flight.

According to a second aspect of the invention there is provided a crop feeding apparatus comprising:

a rotatable roller mounted for rotation around a longitudinal axis such that an outer peripheral wall of the roller rotates;

a plurality of finger units mounted within the roller arranged to provide a plurality of fingers projecting outwardly of the peripheral wall for engaging crop outside the peripheral wall;

each finger unit including a pair of fingers, the roller having in the peripheral wall thereof a plurality of pairs of finger guide holes spaced axially of the roller with each pair disposed on opposite sides of the roller;

each pair of finger guide holes being associated with said pair of fingers of a respective finger unit such that each of said pair of fingers extends through and is slidable in a respective one of said pair of holes in opposite sides of the roller so as to be movable along its length from a retracted position in which an end of the finger is adjacent the peripheral wall to an extended position;

each finger unit including an inner member within the roller to which the pair of fingers are affixed so that movement of the inner member acts to drive the fingers to said retracted and extended positions;

said inner member containing an elongate guide slot extending transversely to the axis of the roller and generally transverse to the longitudinal direction of movement of the fingers;

and a stationary guide member within the roller mounted within the guide slot at a position within the roller arranged to cause the inner member with said fingers of each of the finger units to reciprocate during the rotation of the roller;

wherein the guide slot of the inner member is shaped so as to comprises a center portion transverse to the longitudinal direction of movement of the fingers and at least one lobe portion at an end of the center portion diverging to one side of the center portion.

According to a third aspect of the invention there is provided a crop feeding apparatus comprising:

a rotatable roller mounted for rotation around a longitudinal axis such that an outer peripheral wall of the roller rotates;

a plurality of finger units mounted within the roller arranged to provide a plurality of fingers projecting outwardly of the peripheral wall for engaging crop outside the peripheral wall;

each finger unit including a pair of fingers, the roller having in the peripheral wall thereof a plurality of pairs of finger guide holes spaced axially of the roller with each pair disposed on opposite sides of the roller;

each pair of finger guide holes being associated with said pair of fingers of a respective finger unit such that each of said pair of fingers extends through and is slidable in a respective one of said pair of holes in opposite sides of the roller so as to be movable along its length from a retracted position in which an end of the finger is adjacent the peripheral wall to an extended position;

each finger unit including an inner member within the roller to which the pair of fingers are affixed so that movement of the inner member acts to drive the fingers to said retracted and extended positions;

said inner member containing an elongate guide slot extending transversely to the axis of the roller and generally transverse to the longitudinal direction of movement of the fingers;

and a stationary guide member within the roller mounted within the guide slot at a position within the roller arranged to cause the inner member with said fingers of each of the finger units to reciprocate during the rotation of the roller;

wherein the guide slot of the inner member is generally S-shaped so as to comprises a center portion transverse to the longitudinal direction of movement of the fingers and a first lobe portion at a first end of the center portion diverging to a first side of the center portion and a second lobe portion at a second end of the center portion diverging to a second side of the center portion.

According to a fourth aspect of the invention there is provided a crop feeding apparatus comprising:

a rotatable roller mounted for rotation around a longitudinal axis such that an outer peripheral wall of the roller rotates;

a plurality of finger units mounted within the roller arranged to provide a plurality of fingers projecting outwardly of the peripheral wall for engaging crop outside the peripheral wall;

each finger unit including a pair of fingers, the roller having in the peripheral wall thereof a plurality of pairs of finger guide holes spaced axially of the roller with each pair disposed on opposite sides of the roller;

each pair of finger guide holes being associated with said pair of fingers of a respective finger unit such that each of said pair of fingers extends through and is slidable in a respective one of said pair of holes in opposite sides of the roller so as to be movable along its length from a retracted position in which an end of the finger is adjacent the peripheral wall to an extended position;

each finger unit including an inner member within the roller to which the pair of fingers are affixed so that movement of the inner member acts to drive the fingers to said retracted and extended positions;

said inner member containing an elongate guide slot extending transversely to the axis of the roller and generally transverse to the longitudinal direction of movement of the fingers;

and a stationary guide member within the roller mounted within the guide slot at a position within the roller arranged to cause the inner member with said fingers of each of the finger units to reciprocate during the rotation of the roller;

wherein the guide slot of the inner member is generally C-shaped so as to comprises a center portion transverse to the longitudinal direction of movement of the fingers and a first lobe portion at a first end of the center portion diverging to a first side of the center portion and a second lobe portion at a second end of the center portion diverging to said first side of the center portion.

According to a particularly preferred use of the above system, there is provided harvesting machine comprising a feeder house having a conveyor chain therein for transporting a crop material and a crop feed roller apparatus as defined above in front of the feeder house for feeding the crop material into the feeder house.

The primary benefit is that fingers move straight in and out where as conventional designs have an unfavorable less aggressive angle in front to help grab the crop and then and then a more aggressive angle during release into the combine feeder.

It is believed the pairs of fingers are more aggressive in feeding relative to a single finger.

Also finger angles are unfavorable for reversing the auger where fingers have an aggressive angle at point of release back into the header.

Conventional arrangements provide greater strain on the fingers and bearings when the finger is fully extended.

The conventional drive arrangement using a control shaft around with the fingers rotate provides a high crop loading on the shaft which is greatly reduced with this design.

Thus the arrangement herein provides a better tip path profile where the shape of the guide slot with the lobe portions acts to control the finger path.

The arrangement herein, where the fingers move radially of the roller rather than angularly, reduces the inertia loading on the fingers and the guide bearings.

The arrangement herein, where the fingers move radially of the roller rather than angularly, allows the use of cylindrical bushings or bearings at the wall of the roller.

The following definitions are used herein:

"Finger Projection" is the distance that the tip of the finger is from the outer surface of the drum.

"Dwell Angle" is the angle for which the Finger Projection is more than 90% of the maximum Finger Projection.

"Swept Area" is the area encompassed by a curve following the tip of the finger through one revolution, minus the area of the drum.

"Offset" is the distance the control roller is from the center of the drum.

The arrangements described in more detail hereinafter provide track shapes which can be of S-Shape or C-Shape or a more complex shape with curved lobes relative to a linear transverse center portion.

The S-Shape of the track modifies the dwell time of the finger. That is, as the radius of the S-Shape approaches the control roller offset, the finger remains in full extension throughout the arc of the S-Shape. The S can be rotated with respect to the finger to alter the finger pattern.

A C-Shape track provides the greatest dwell time and swept area. A track of a more complex curve can be provided to control the external envelope of the finger pattern to account for external space constraints The fixed guide roller is typically moved in an arc around the center of the drum to adjust finger "Timing". That is the point of maximum finger projection relative to a fixed point in space. As the fixed guide roller is moved to adjust "Timing" the finger pattern rotates about the drum In order to reverse the finger pattern for use in reversing the roller during an unblocking process, the guide roller is moved to a position to the rear of the feed drum.

The S shape as shown herein is the preferred design. The S shape is perpendicular to the finger at the point where it crosses the finger, and the radius of the S shape is slightly larger than the distance between the center of the drum and the control roller. This larger radius is necessary to lower the control loads due to the inertia of the finger system, as well as maximize the dwell given the constraints of the swept diameter and drum size.

BRIEF DESCRIPTION OF THE DRAWINGS

One embodiment of the invention will now be described in conjunction with the accompanying drawings in which:

FIG. 4A is a view similar to that of FIG. 4 showing the effect of movement of the guide roller in an arc around the center of the drum.

FIG. 4C is a view similar to that of FIG. 4 showing the effect of rotating the S-shaped track with respect to the finger to alter the finger pattern.

FIG. 5 is an isometric view partly broken away showing the roller and finger drive arrangement.

FIG. 6 is cross-sectional view along the lines 6-6 of FIG. 4.

FIG. 7 is view similar to that of FIG. 4 showing a C-shaped guide track.

In the drawings like characters of reference indicate corresponding parts in the different figures.

DETAILED DESCRIPTION

Figure 1:
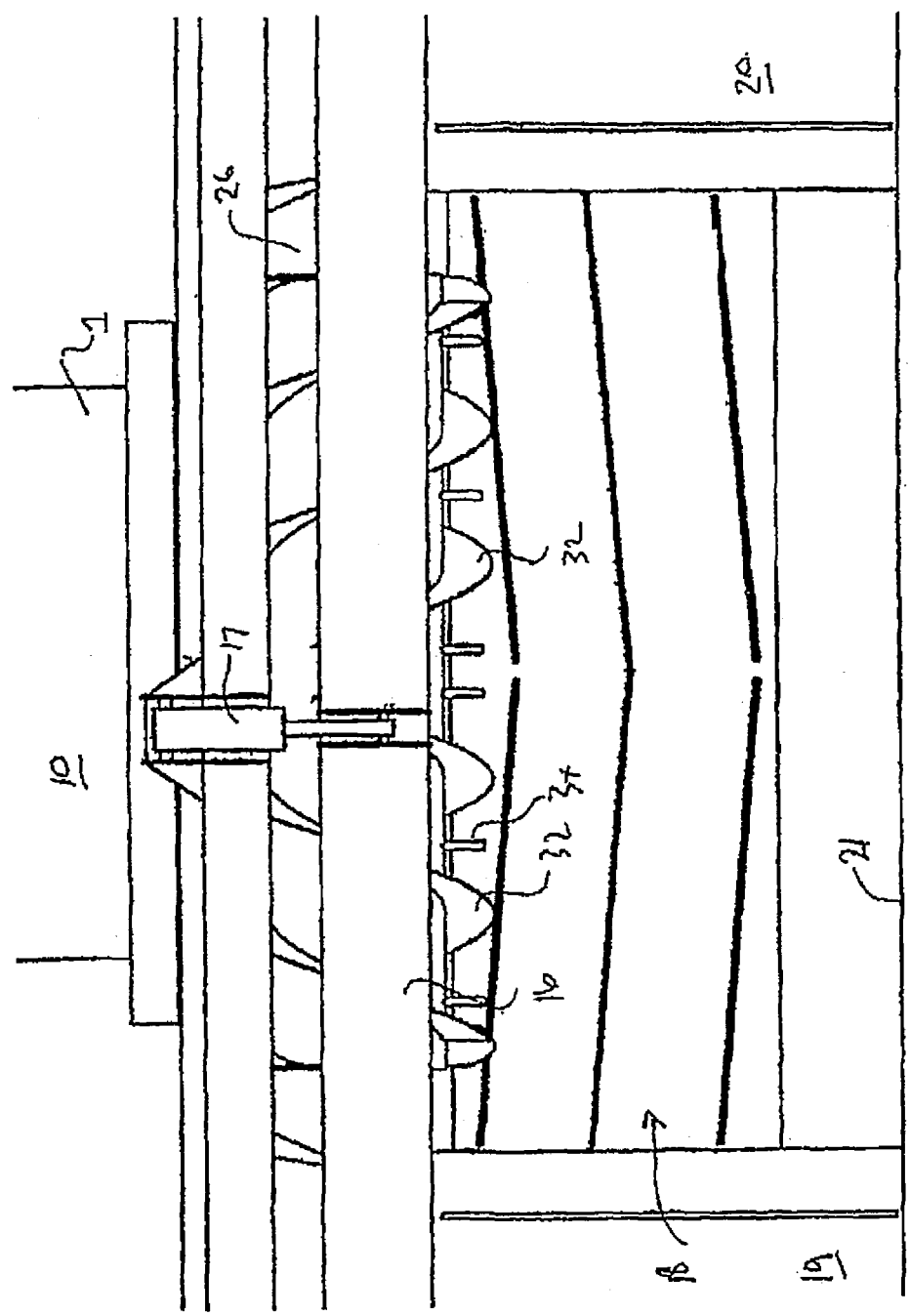
FIG. 1 is a plan view showing the combine feeder house and central section of a header.
Figure 2:
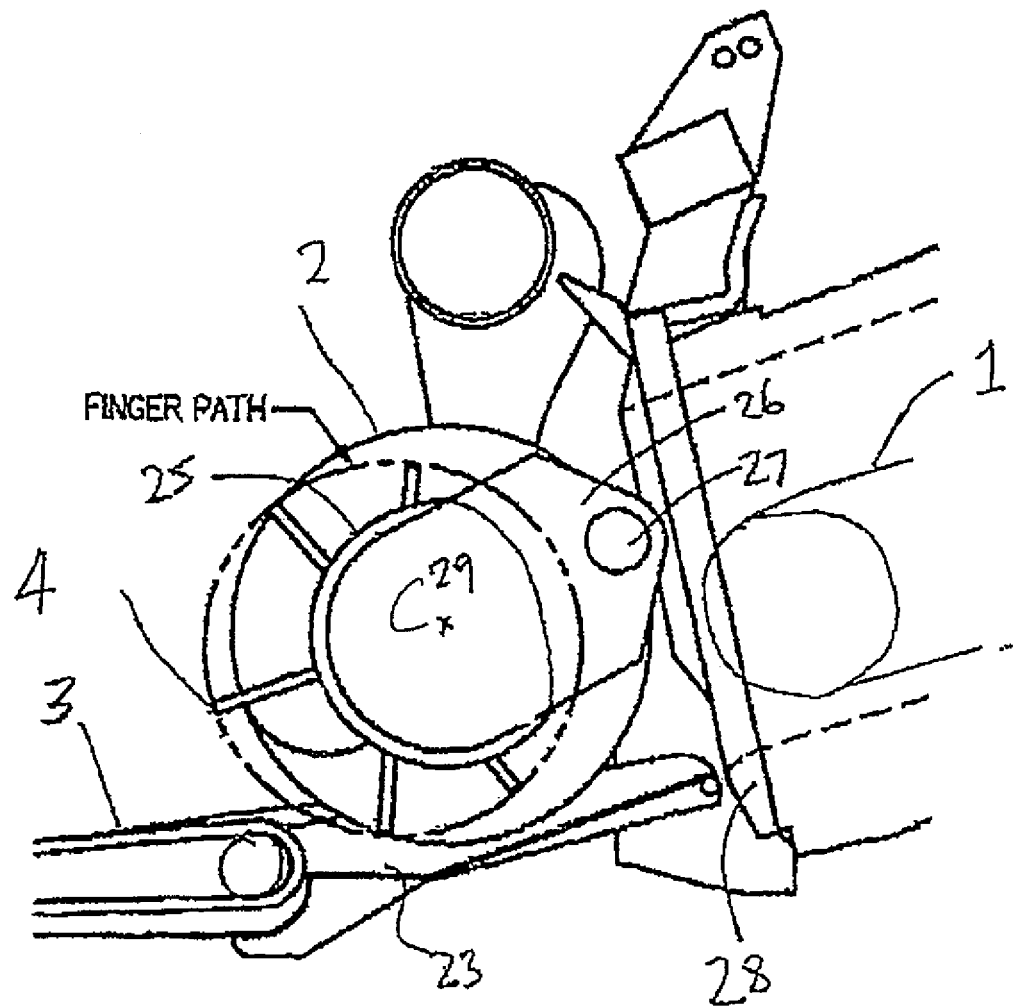
FIG. 2 is a section view through the centerline of the header and feeder house in the normal forward operating position showing the relationship between the feed chain, the auger and the feed draper with the fingers shown in the normal forward position where they can engage crop fed off the feed draper, convey it to the rear and release it so that the feeder house feed chain can feed the crop material into the combine.
Figure 3:
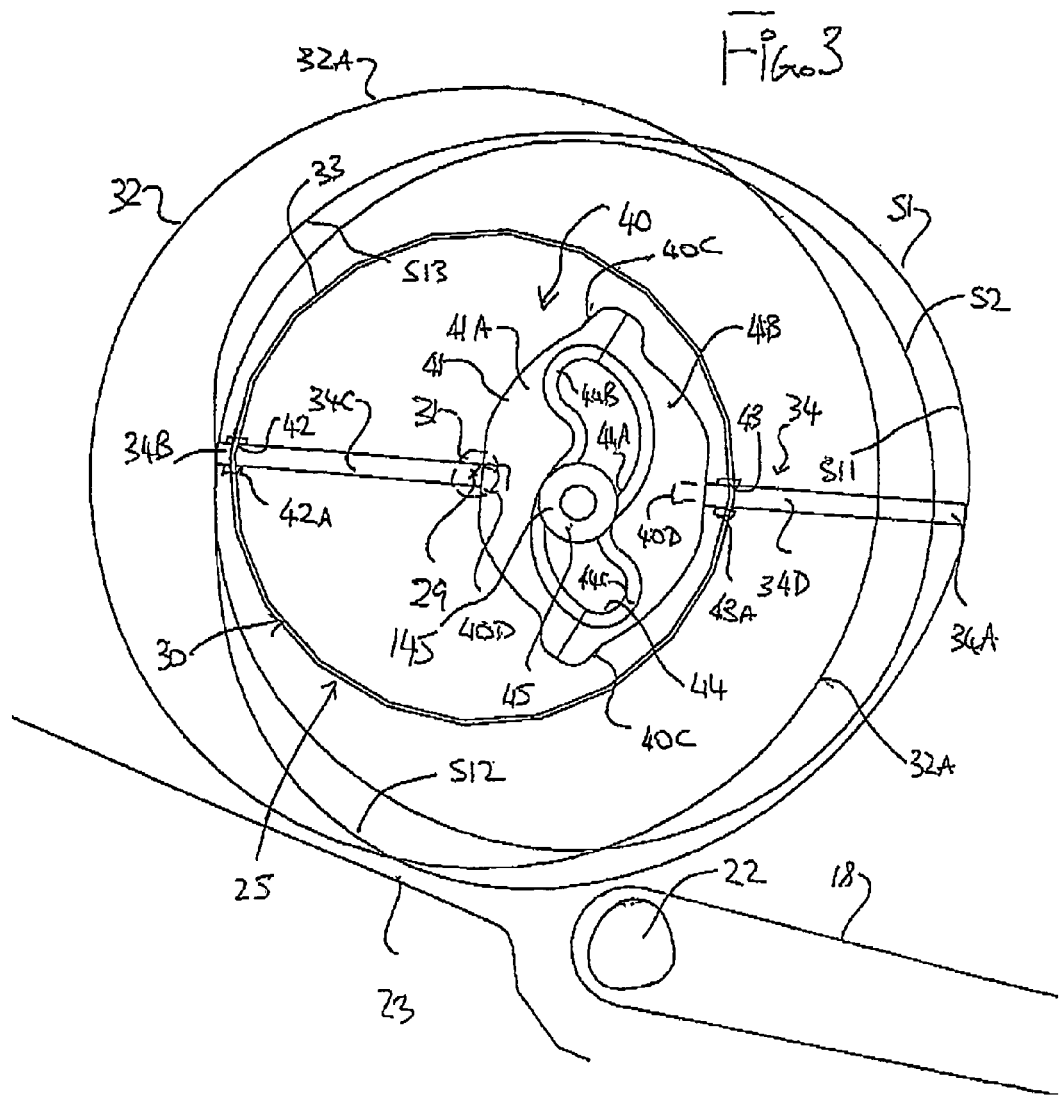
FIG. 3 is a detailed section of the auger showing the finger drive arrangement.

In FIGS. 1, 2 and 3 is shown an arrangement of header and feeder house for a combine harvester of the type generally shown in U.S. Pat. No. 6,675,568 issued Jan. 13, 2004 of the present assignee and Canadian Published Application 2,341, 283 published Sep. 16, 2002, the disclosures of which are incorporated herein by reference.

Details of the main construction of the header are omitted since these are well known to one skilled in the art and are available from the above patent documents. The present arrangement is concerned primarily with the construction of the feed roller which is shown in detail herein so that other arrangements shown in the present documents may vary in accordance with the requirements of a person skilled in the art.

Thus the arrangement as shown comprises a feeder house 10 having a feeder chain 11 mounted within the feeder house for rotation of the feeder chain around a drive sprocket 12 so that crop material is carried underneath the bottom run 13 of the feeder chain along the bottom surface of the feeder house to the operating components of the combine harvester (which we are not shown).

At the forward end of the feeder house is mounted a header construction generally indicated at 15 which is carried on a main frame 16 in the form of a tube which is attached to the forward end of the feeder house by a link 17. Bottom links which support the header are not shown as again these are well known to one skilled in the art.

The header further includes a feed draper 18 which carries the crop rearwardly from two side drapers 20 behind a cutting knife 21 at the forward end of the header. The feed draper 18 is engaged around a roller 22 at the rear of the feed draper and in front of the feeder house and its chain 11. A pan 23 bridges the area between the rear of the draper 18 and the front of the feeder house so as to carry the material rearwardly.

A feed roller 25 is provided which assists the transfer of the crop material from the rear of the feed draper 18 into the feeder house and also applies a top compression to the crop material so as to hold it downwardly and assist in feeding the crop material under the feeder chain. Thus the roller 25 extends across the width of the feeder house 10 as shown in FIG. 1 and slightly beyond the outside edges of the feeder house to a length so as to be located just within the extent of the feed draper 18 and between the side drapers 19 and 20. The roller 25 is carried on a pair of arms 26 one at each end each of which is pivotal about a pivot pin 27 carried on an adaptor frame 28 attached to the front of the feeder house. Thus the axis 29 of the roller can raise and lower pivoting about the axis of the pin 27 to accommodate more or less crop passing underneath the roller and over the pan 23.

Figure 4:
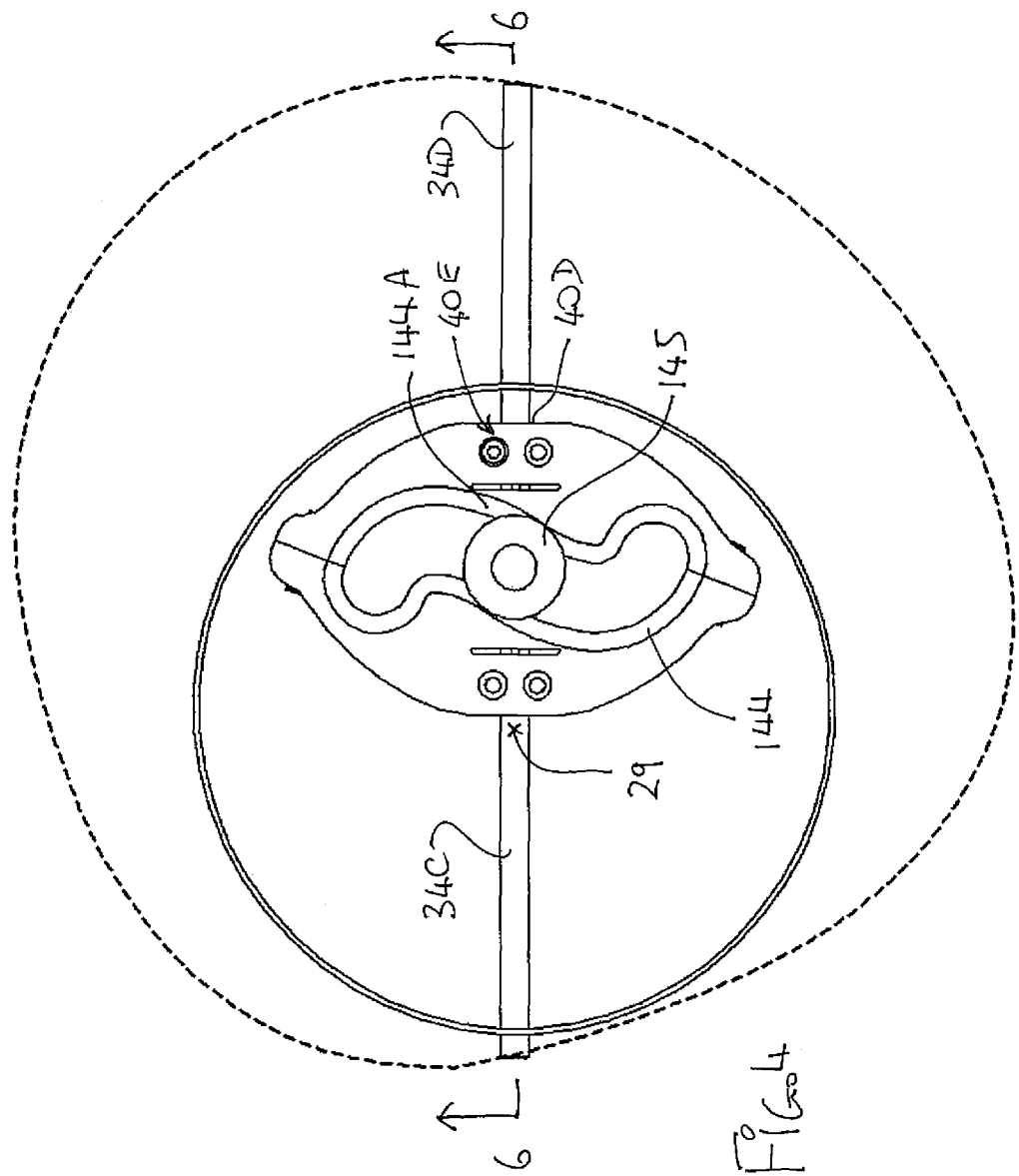
FIG. 4 is a detailed section of the auger showing the finger drive arrangement with a different contour of the S-shaped guide track and different location of the guide roller.

The roller 25 as best shown in FIGS. 4 and 5 comprises a roller wall 30 which is cylindrical carried for rotation on stub-shafts 31 mounted suitably on the arms 26 and connected to end walls of the roller 25 so that the interior of the roller has no support at the axis 29 of the shafts 31. On the outside surface of the roller is provided an auger flight 32 which is arranged helically around the wall 30 and its outer surface 33 so as to project outwardly therefrom. The auger flight, as is well known, is arranged in two sections coiled in opposite directions so as to tend to carry the crop inwardly toward the center of the feeder house as the roller rotates in a feeding or counter clockwise direction as shown in FIG. 4.

In addition the roller carries fingers 34 at angularly and axially spaced positions around the peripheral surface 33 of the roller. In the embodiment shown there are six angularly spaced positions of the fingers and six axially spaced positions of the fingers. However these numbers may vary in accordance with requirements.

The fingers rotate with the roller 25 but are driven by an arrangement described in more detail hereinafter so that they move radially of the axis of the roller as the roller angularly advances. Thus in one of the fingers indicated at 34A provides a maximum extension of the fingers beyond the surface 33 so that the finger projects beyond an outside edge 32A of the flight. This maximum extension position 34A is generally at or just above the three o'clock position in FIG. 3 or immediately at the front of the roller facing the crop. This position may be slightly angularly advanced or slightly angularly retarded as required so that for example as shown in FIG. 2 with the roller in its lowered position close down onto the pan 23 the most extended position is approximately at the 8.30 position around the axis of the roller.

Symmetrically the most retracted position of the fingers is indicated at 34B which is located directly behind the roller. Thus the normal operation of the roller and the fingers carried thereby is that the fingers extend to their maximum extension in front of the rollers so as to grasp the crop in front of the roller and tending to pile in front of the roller and to push that crop downwardly and to carry it rearwardly in a feeding action over the pan 23 to the feeder house. Behind the roller the fingers gradually retract to the position indicated at 34B where the outer end of the finger is substantially flush with the surface 33 so as to ensure that the crop is released at this position and is not carried by the fingers in a wrapping action around the remainder of the roller.

The above description relates to conventional constructions which are well known for providing a feeding action.

Turning now to the drive arrangement for the fingers of the roller as shown in FIGS. 3, 4, 5 and 6, the roller 25 has an outer peripheral wall 33 of the roller which rotates as described above and contains a plurality of finger units 40 mounted within the roller 25 arranged to provide a plurality of fingers 34C, 34D projecting outwardly of the peripheral wall for engaging crop outside the peripheral wall 33.

Each finger unit includes a center inner member 41 carrying the pair of fingers 34C and 34D which are co-linear and lie on a diameter of the axis 29 of the roller. The roller has in the peripheral wall 33 thereof a plurality of pairs of finger guide holes 42, 43 spaced axially of the roller with each pair disposed on opposite sides of the roller on the diameter defined by the fingers 34C, 34D. Each pair of finger guide holes includes a tubular bushing 42A, 43A such that each of the pair of fingers extends through and is slidable in a respective one of the pair of holes in opposite sides of the roller so as to be movable along its length from a retracted position in which an end of the finger is adjacent the peripheral wall to an extended position on the finger path.

Each finger unit includes a respective inner member 41 within the roller to which the pair of fingers are affixed so that movement of the inner member 41 acts to drive the fingers to the retracted and extended positions. Each inner member 41 is formed in two portions 41A, 41B which are identical and arranged back to back and connected by bolts 40C at top and bottom. Each portion has a bore 40D into which a respective one of the fingers 34B, 34C is inserted and attached by fasteners 40E to hold the fingers co-linear and extending outwardly from the outer face of the portions.

In order to drive the fingers to the retracted and extended positions, the inner member 41 defines an internal continuous elongate guide slot 44 which cooperates with a stationary guide member 45 inside the roller 25 arranged to cause the inner member 41 with the fingers of each of the finger units to reciprocate during the rotation of the roller. The stationary guide member is mounted on a common shaft with a plurality of similar guide members each associated with a respective inner member arranged along the length of the roller.

The guide slot extends generally transverse to the axis of the roller and generally transverse to the longitudinal direction of movement of the fingers. The stationary guide member 45 is offset from the center 29 of the roller so that the rotation of the inner member 41 with the roller causes the stationary guide member 45 to slide along the slot 44 which forces the inner member 41 to follow a path defined by the slot 44. Thus the guide slot 44 defined by the inner member 41 lies in a radial plane of the axis of the roller and the fingers 34C, 34D lie on a diameter of the roller with the guide holes 42, 43 being diametrically opposed thus generating a predetermined movement of the inner member and the fingers carried thereby.

Instead of being straight and transversely across the line defined by the fingers, the guide slot 44 of the inner member is generally S-shaped so as to comprises a center portion 44A transverse to the longitudinal direction of movement of the fingers and a first lobe portion 44B at a first end of the center portion diverging to a first side of the center portion and a second lobe portion 44C at a second end of the center portion diverging to a second side of the center portion.

This S-shape of the slot generates a path of the ends 34A and 34B of the fingers which is particularly advantageous and is shown in FIG. 3. Thus the S-shape of the guide slot causes the finger ends to follow a path S1 which is different from the generally circular path S2 of the conventional drive arrangements. This path has lobes S11, S12 and S13 of maximum extension of the fingers where the path is outside the conventional path S2. The path S1 however has a minimum projection of the finger at the same position directly behind the roller at 34B. Thus the important action of the finger at or just above the 3 o'clock position in FIG. 3 is increased by the increased extent of the finger at this location relative to the path S2. The finger then remains extended outside the path S2 until it is required to be retracted at the 9 o'clock position shown at 34B.

As shown particularly in FIG. 3, the stationary guide member 45 includes a roller 145 running in the guide slot 44 and the guide slot and the roller are correspondingly V-shaped in cross-section with the roller 145 having a V-shaped recess 45R to receive a projecting apex 44R on the wall of the slot 44 so as to maintain the guide roller 145 tracking in the guide slot 44.

In the arrangement of FIG. 4, the guide roller 145 is located relative to the diameter of the roller 25 so that it lies on or close to the diameter containing the fingers 34C and 34D. This acts to change the finger pattern by moving the lobes S11, S12 and S13.

As shown in FIG. 4A at arrow X, the guide roller 145 is moved in an arc around the axis 29 of the drum to adjust finger "timing" as indicated at arrow T, that is the point of maximum finger projection relative to a fixed point in space.

Figure 4B:
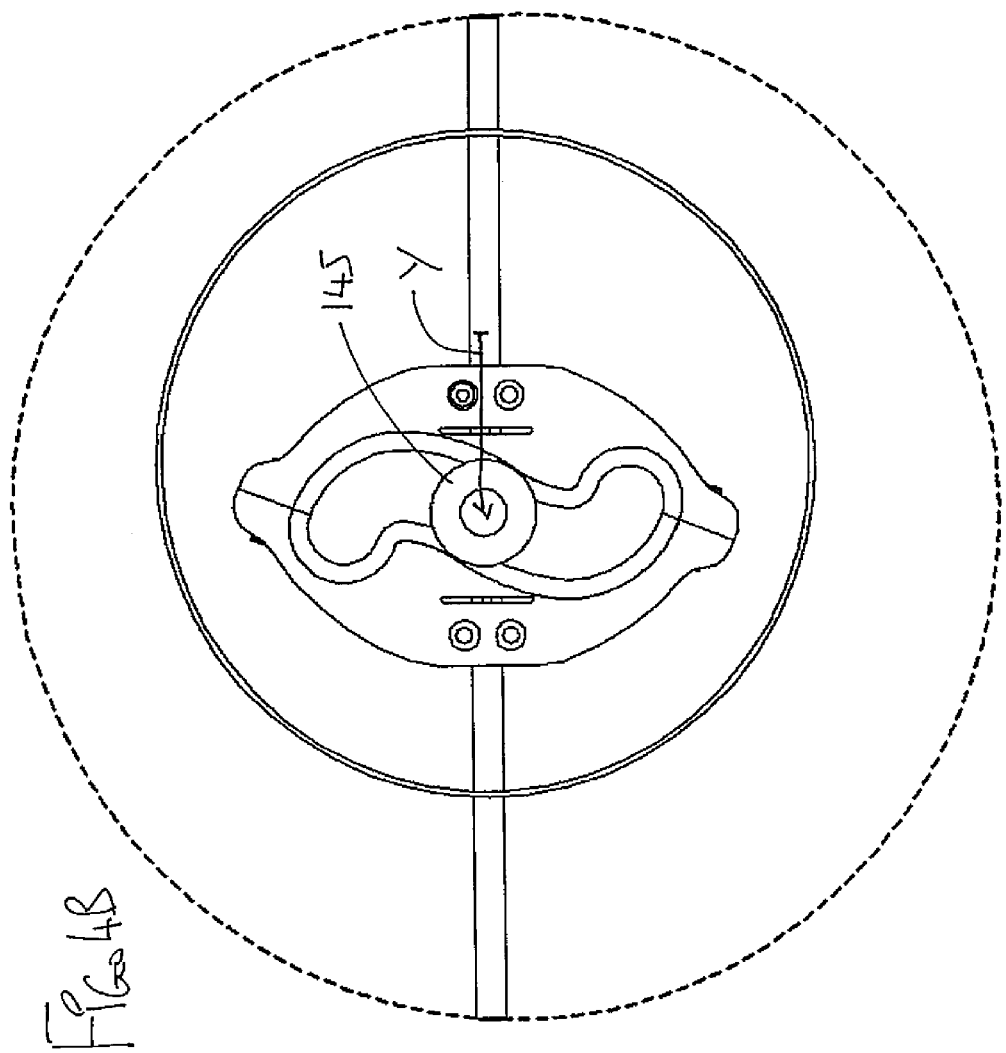
FIG. 4B is a view similar to that of FIG. 4 showing that the finger pattern can be reversed by moving the guide roller to a position to the rear of the feed drum.

As shown in FIG. 4B at arrow Y, in order to reverse the finger pattern for use in reversing the roller during an unblocking process, the guide roller 145 is moved from its position in FIG. 4 to a position to the rear of the feed drum.

As shown in FIG. 4C at arrow Z, the S-shaped track can be rotated about the axis A of the guide roller with respect to the finger to alter the finger pattern.

The S shaped track as shown in FIG. 3 formed of two smooth interconnecting curves with no straight parallel sections is the preferred design. The S shape is perpendicular to the finger at the point where it crosses the finger, and the radius of the smooth curves of the S shape is arranged to be of the same order of magnitude a or slightly larger than the distance between the center 29 of the drum and the axis of the control roller 145. This radius Is necessary to lower the control loads due to the inertia of the finger system, as well as to maximize the dwell given the constraints of the swept diameter and drum size. Also as shown in FIG. 4C, the curvature of the S-shape is reduced so that a divergence to one side of a straight line L through the axis A is reduced relative to previous embodiments. The S-shape may or may not have straight lines parallel to the line L at the axis A or may be formed from two interconnecting smooth curves.

In FIG. 7 is shown the pattern generated by a C-shaped track 148 which is two smooth curves 149, 150 joining at the center axis A with little or no straight section but where the curves are on the same side of the guide roller 145. This provides as shown up to 180° of dwell, the largest swept area and a finger pattern which is not symmetrical.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A crop feeding apparatus comprising:
    a rotatable roller mounted for rotation around a longitudinal axis such that an outer peripheral wall of the roller rotates;
    a plurality of finger units mounted within the roller at axially spaced positions along the rotatable roller;
    each finger unit comprising a pair of fingers and an inner finger member within the rotatable roller to which the pair of fingers are affixed so that movement of the inner finger member acts to drive the fingers to retracted and extended positions;
    the roller having in the peripheral wall thereof a plurality of pairs of finger guide holes at positions spaced axially of the roller with each pair of finger guide holes associated with respective ones the pair of fingers of a respective one of the finger units;
    each pair of finger guide holes being located at diametrically opposed positions of the rotatable roller;
    said pair of fingers of each respective finger unit extending diametrically;
    such that a first of said pair of fingers extends through and is slidable along its length in a first one of said pair of holes from a retracted position in which an end of the first one of the fingers is adjacent the peripheral wall to an extended position in which the end of the first one of the fingers is spaced outwardly of the peripheral wall;
    and such that a second of said pair of fingers extends through and is slidable along its length in a second one of said pair of holes from a retracted position in which an end of the second one of the fingers is adjacent the peripheral wall to an extended position in which the end of the second one of the fingers is spaced outwardly of the peripheral wall;
    said first and second of the said pair of fingers being connected to the inner finger member such that the first of the pair of fingers is moved to the retracted position as the second of the pair of fingers is moved to the extended position and vice versa;
    said inner finger member containing an elongate guide slot extending transversely to the axis of the roller and generally transverse to the longitudinal direction of movement of the first and second fingers of the pair of fingers;
    and a stationary guide member located within the roller and mounted within the guide slot at a position arranged to cause the inner finger member with said first and second ones of the fingers attached thereto to reciprocate during the rotation of the roller relative to the stationary guide member;
    wherein the guide slot of the inner member is shaped so as to comprise at least one curved lobe portion.

2. The apparatus according to claim 1 wherein the guide slot lies in a radial plane of the axis of the roller.

3. The apparatus according to claim 1 wherein the fingers lie on a diameter of the roller and the guide holes are diametrically opposed.

4. The apparatus according to claim 1 wherein the guide slot and the stationary guide member are correspondingly V-shaped in cross-section so as to maintain the guide member tracking in the guide slot.

5. The apparatus according to claim 1 wherein the stationary guide member includes a roller running in the guide slot.

6. The apparatus according to claim 1 wherein the inner member is formed in two portions each forming one side of the guide slot.

7. The apparatus according to claim 6 wherein the portions are identical or mirror image.

8. The apparatus according to claim 6 wherein each of the portions carries a respective one of the fingers.

9. The apparatus according to claim 1 wherein each inner member carries only a single pair of diametrically opposed fingers.

10. The apparatus according to claim 1 wherein said stationary guide member is mounted for adjustment in a direction angularly around the axis of the roller.

11. The apparatus according to claim 1 wherein each guide hole includes a stationary tubular bearing in the roller wall through which said finger reciprocates in said longitudinal direction.

12. The apparatus according to claim 1 wherein the peripheral surface of the roller carries a helical flight and wherein the fingers in their maximum extent project outwardly beyond the outer edge of the flight.

13. A harvesting machine comprising:
    a feeder house having a conveyor chain therein for transporting a crop material;

and a crop feed roller apparatus according to claim 1 in front of the feeder house for feeding the crop material into the feeder house.

14. A crop feeding apparatus comprising:

a rotatable roller mounted for rotation around a longitudinal axis such that an outer peripheral wall of the roller rotates;

a plurality of finger units mounted within the roller at axially spaced positions along the rotatable roller;

each finger unit comprising a pair of fingers and an inner finger member within the rotatable roller to which the pair of fingers are affixed so that movement of the inner finger member acts to drive the fingers to retracted and extended positions;

the roller having in the peripheral wall thereof a plurality of pairs of finger guide holes at positions spaced axially of the roller with each pair of finger guide holes associated with respective ones the pair of fingers of a respective one of the finger units;

each pair of finger guide holes being located at diametrically opposed positions of the rotatable roller;

said pair of fingers of each respective finger unit extending diametrically;

such that a first of said pair of fingers extends through and is slidable along its length in a first one of said pair of holes from a retracted position in which an end of the first one of the fingers is adjacent the peripheral wall to an extended position in which the end of the first one of the fingers is spaced outwardly of the peripheral wall;

and such that a second of said pair of fingers extends through and is slidable along its length in a second one of said pair of holes from a retracted position in which an end of the second one of the fingers is adjacent the peripheral wall to an extended position in which the end of the second one of the fingers is spaced outwardly of the peripheral wall;

said first and second of the said pair of fingers being connected to the inner finger member such that the first of the pair of fingers is moved to the retracted position as the second of the pair of fingers is moved to the extended position and vice versa;

said inner finger member containing an elongate guide slot extending transversely to the axis of the roller and generally transverse to the longitudinal direction of movement of the first and second fingers of the pair of fingers;

and a stationary guide member located within the roller and mounted within the guide slot at a position arranged to cause the inner finger member with said first and second ones of the fingers attached thereto to reciprocate during the rotation of the roller relative to the stationary guide member;

wherein the guide slot of the inner member is shaped so as to comprise a center portion transverse to the longitudinal direction of movement of the fingers and at least one lobe portion at an end of the center portion diverging to one side of the center portion.

15. A harvesting machine comprising:

a feeder house having a conveyor chain therein for transporting a crop material;

and a crop feed roller apparatus according to claim 14 in front of the feeder house for feeding the crop material into the feeder house.

16. A crop feeding apparatus comprising:

a rotatable roller mounted for rotation around a longitudinal axis such that an outer peripheral wall of the roller rotates;

a plurality of finger units mounted within the roller at axially spaced positions along the rotatable roller;

each finger unit comprising a pair of fingers and an inner finger member within the rotatable roller to which the pair of fingers are affixed so that movement of the inner finger member acts to drive the fingers to retracted and extended positions;

the roller having in the peripheral wall thereof a plurality of pairs of finger guide holes at positions spaced axially of the roller with each pair of finger guide holes associated with respective ones the pair of fingers of a respective one of the finger units;

each pair of finger guide holes being located at diametrically opposed positions of the rotatable roller;

said pair of fingers of each respective finger unit extending diametrically;

such that a first of said pair of fingers extends through and is slidable along its length in a first one of said pair of holes from a retracted position in which an end of the first one of the fingers is adjacent the peripheral wall to an extended position in which the end of the first one of the fingers is spaced outwardly of the peripheral wall;

and such that a second of said pair of fingers extends through and is slidable along its length in a second one of said pair of holes from a retracted position in which an end of the second one of the fingers is adjacent the peripheral wall to an extended position in which the end of the second one of the fingers is spaced outwardly of the peripheral wall;

said first and second of the said pair of fingers being connected to the inner finger member such that the first of the pair of fingers is moved to the retracted position as the second of the pair of fingers is moved to the extended position and vice versa;

said inner finger member containing an elongate guide slot extending transversely to the axis of the roller and generally transverse to the longitudinal direction of movement of the first and second fingers of the pair of fingers;

and a stationary guide member located within the roller and mounted within the guide slot at a position arranged to cause the inner finger member with said first and second ones of the fingers attached thereto to reciprocate during the rotation of the roller relative to the stationary guide member;

wherein the guide slot of the inner member is generally S-shaped so as to comprise a center portion transverse to the longitudinal direction of movement of the fingers and a first lobe portion at a first end of the center portion diverging to a first side of the center portion and a second lobe portion at a second end of the center portion diverging to a second side of the center portion.

17. A harvesting machine comprising:

a feeder house having a conveyor chain therein for transporting a crop material;

and a crop feed roller apparatus according to claim 16 in front of the feeder house for feeding the crop material into the feeder house.

18. A crop feeding apparatus comprising:

a rotatable roller mounted for rotation around a longitudinal axis such that an outer peripheral wall of the roller rotates;

a plurality of finger units mounted within the roller at axially spaced positions along the rotatable roller;

each finger unit comprising a pair of fingers and an inner finger member within the rotatable roller to which the pair of fingers are affixed so that movement of the inner finger member acts to drive the fingers to retracted and extended positions;

the roller having in the peripheral wall thereof a plurality of pairs of finger guide holes at positions spaced axially of the roller with each pair of finger guide holes associated with respective ones the pair of fingers of a respective one of the finger units;

each pair of finger guide holes being located at diametrically opposed positions of the rotatable roller;

said pair of fingers of each respective finger unit extending diametrically;

such that a first of said pair of fingers extends through and is slidable along its length in a first one of said pair of holes from a retracted position in which an end of the first one of the fingers is adjacent the peripheral wall to an extended position in which the end of the first one of the fingers is spaced outwardly of the peripheral wall;

and such that a second of said pair of fingers extends through and is slidable along its length in a second one of said pair of holes from a retracted position in which an end of the second one of the fingers is adjacent the peripheral wall to an extended position in which the end of the second one of the fingers is spaced outwardly of the peripheral wall;

said first and second of the said pair of fingers being connected to the inner finger member such that the first of the pair of fingers is moved to the retracted position as the second of the pair of fingers is moved to the extended position and vice versa;

said inner finger member containing an elongate guide slot extending transversely to the axis of the roller and generally transverse to the longitudinal direction of movement of the first and second fingers of the pair of fingers;

and a stationary guide member located within the roller and mounted within the guide slot at a position arranged to cause the inner finger member with said first and second ones of the fingers attached thereto to reciprocate during the rotation of the roller relative to the stationary guide member;

wherein the guide slot of the inner member is generally C-shaped so as to comprise a center portion transverse to the longitudinal direction of movement of the fingers and a first lobe portion at a first end of the center portion diverging to a first side of the center portion and a second lobe portion at a second end of the center portion diverging to said first side of the center portion.

19. A harvesting machine comprising:

a feeder house having a conveyor chain therein for transporting a crop material;

and a crop feed roller apparatus according to claim 18 in front of the feeder house for feeding the crop material into the feeder house.

* * * * *